United States Patent [19]
Mansur

[11] Patent Number: 5,941,317
[45] Date of Patent: Aug. 24, 1999

[54] ROW CULTIVATOR WITH LATERALLY MOVEABLE TOOL BAR

[75] Inventor: Peter Lloyd Mansur, New South Wales, Australia

[73] Assignee: Great Western Corporation Pty Ltd., Brisbane, Australia

[21] Appl. No.: 08/902,944

[22] Filed: Jul. 30, 1997

[30] Foreign Application Priority Data

Aug. 1, 1996 [AU] Australia .................................. P01352

[51] Int. Cl.⁶ .................................................. A01B 69/00
[52] U.S. Cl. ................................ 172/2; 172/741; 172/776
[58] Field of Search ................................... 701/50; 172/2, 172/776, 734, 741, 742, 743

[56] References Cited

FOREIGN PATENT DOCUMENTS

| 6078604 | 3/1994 | Japan | ......................................... | 172/2 |
| 6178603 | 6/1994 | Japan | ......................................... | 172/2 |

Primary Examiner—Thomas B. Will
Assistant Examiner—Christopher J. Novosad
Attorney, Agent, or Firm—Fitzpatrick, Cella, Harper & Scinto

[57] ABSTRACT

A row cultivator 10 is drawn behind a prime mover illustrated by the wheels 11 with rows defined by mounds illustrated in terms of the lines 12 before the cultivator and the reshaped mounds being illustrated by the lines 13 located behind the cultivator. As can be seen the rows before the cultivator include an irregularity. In this case there are wide rows shown at 14 and relatively narrow rows shown at 15. The cultivator 10 includes a fixed rigid tool bar 16 and a moveable tool bar 17 travelling behind the fixed tool bar 16 and pivotable relative thereto via connecting bars 18, 19 and 20. Where the rows to be reshaped are all evenly spaced the connecting bars 18, 19 and 20 would be positioned parallel to the rows. The moveable tool bar 17 is displaced to the left. This displacement arises as a consequence of probes 21 and 22 having sensed the irregularity arising from the wider rows 14 and the narrow rows 15 thus causing the lateral displacement of the tool bar 17 to the left to thereby maintain the tool bar 17 centrally between the probes 21 and 22. The tool bars 16 and 17 carry cultivating tools 23 and located at spaced intervals along the tool bars in order to cultivate the rows. The considered effect of the two tool bars as shown is to give evenly spaced reshaped rows.

23 Claims, 6 Drawing Sheets

ROW CULTIVATOR WITH LATERALLY MOVEABLE TOOL BAR

BACKGROUND OF THE INVENTION

1. Field of the Invention

THIS INVENTION relates to an agricultural apparatus for reshaping row mounds and furrows prior to replanting and in particular but not limited to a cultivator for reshaping row mounds and furrows prior to replanting cotton.

2. Description of the Prior Art

Nowadays cotton planting and cultivation techniques have changed, in particular, rather than completely ploughing over an entire field, spent cotton stalks are pulled and existing mounds reshaped for the next planting. What this means is the mounds must be reshaped for the next planting thus retaining the basic structure of the previous rows without the need for complete re-preparation.

The problem arising with this technique and solved by the present invention arises when using wide cultivators encountering existing rows which are unevenly spaced and/or existing rows having combinations of wide and narrow rows presenting in front of the cultivator. This means some rows must be reshaped more than others to give even row spacing behind the cultivator.

The present invention has as its primary object to provide a row cultivator that is designed to reshape existing rows where the rows prior to reshaping possess some form of irregularity but after the cultivator has passed the rows have been reshaped and are evenly spaced.

SUMMARY OF THE INVENTION

In one aspect therefore the present invention resides in a row cultivator adapted to be drawn behind a prime mover to reshape existing alternating mounds and furrows, the cultivator comprising a transversely extending laterally moveable tool bar having spaced cultivating tools giving rise to alternating, evenly spaced longitudinally extending furrows and mounds as the tools are drawn through soil in a longitudinal direction, the tool bar being mounted for transverse displacement and there being provided sensing means and tool bar drive means for causing lateral displacement of said moveable tool bar in response to said sensing means sensing an irregularity in the spacing of the existing rows and mounds, the lateral displacement of the moveable tool bar giving rise to reshaped mounds and furrows absent the irregularity.

Preferably, the row cultivator employs means providing a rigid platform means relative to which the moveable tool bar is moved laterally. The rigid platform means is typically one or more extra tool bars carrying cultivating tools in advance of the moveable tool bar and mounted with means holding the extra tool bars rigid against transverse movement. The means holding the extra tool bars rigid against transverse movement typically comprises one or more coulter wheels travelling behind and coupled to the extra tool bars and anchored in the soil.

The sensing means preferably comprises probes travelling in furrows at each of the outer extremities of the laterally moveable tool bar and differential monitoring means monitoring the spacing between the respective probes and a defined reference, the arrangement being that the monitoring means monitors lateral displacement of the probes about the defined reference, where both probes are the same distance from the defined reference displacement of the moveable tool bar will not arise but where a differential spacing arises the tool bar moves either right or left in response to detection of the difference in order to maintain the differential as near as practicable to zero. Typically, the reference point is selected so that the moveable tool bar is constantly moved so that it is generally centred between the probes.

The tool bar drive means preferably comprises a double acting hydraulic cylinder assembly and cylinder assembly control means operatively disposed to move the moveable tool bar relative to the rigid platform means.

BRIEF DESCRIPTION OF THE INVENTION

In order that the present invention can be more readily understood and be put into practical effect reference will now be made to the accompanying drawings which illustrate preferred embodiments of the invention and wherein.

DESCRIPTION OF THE PREFERRED EMBODIMENT

Figure 1:
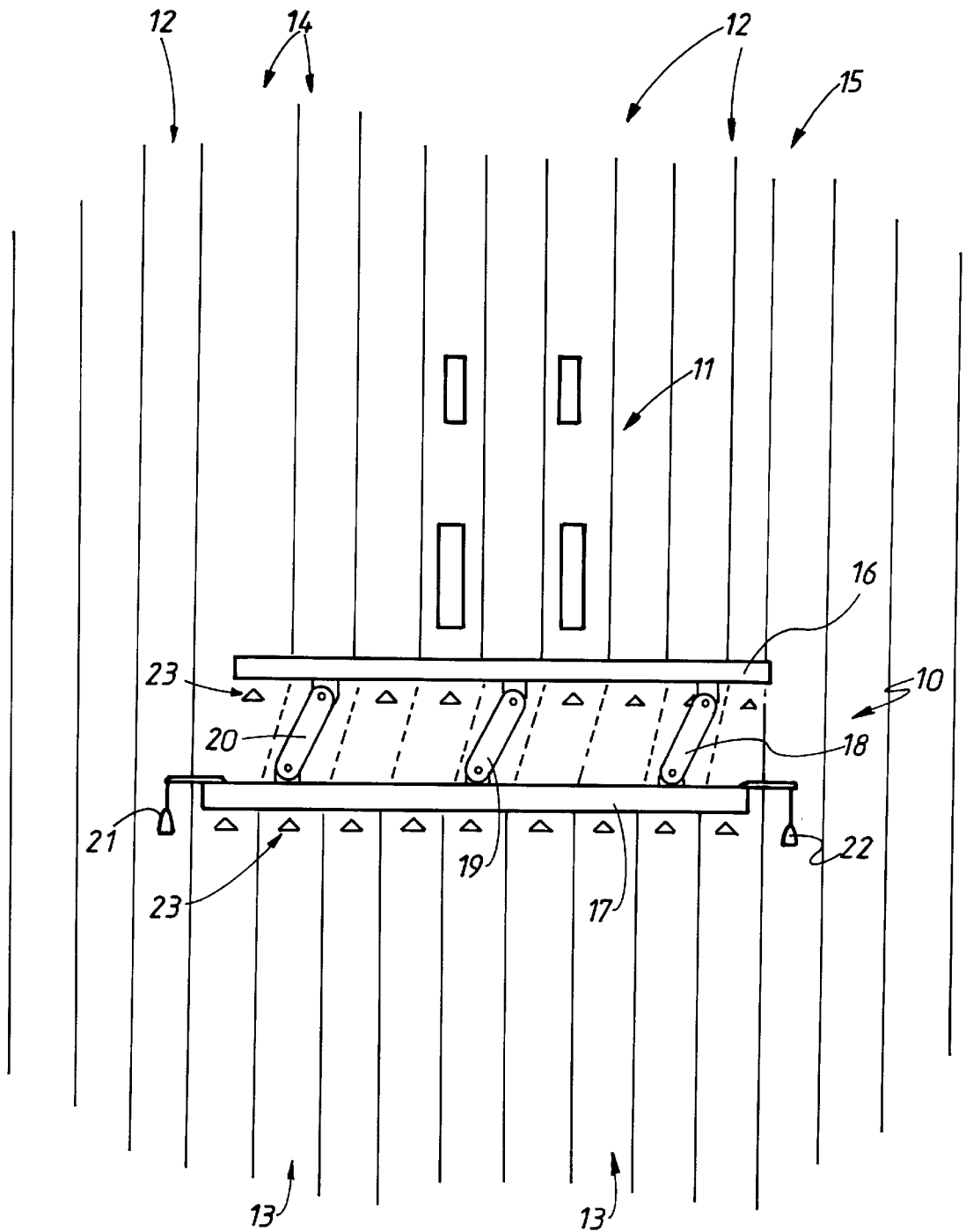
FIG. 1 is a schematic view illustrating a row cultivator according to the present invention.

Referring to the drawings and initially to FIG. 1 there is illustrated in schematic form a row cultivator 10 shown drawn behind a prime mover illustrated by the wheels 11 with rows defined by mounds illustrated in terms of the lines 12 before the cultivator and the reshaped mounds being illustrated by the lines 13 located behind the cultivator. As can be seen the rows before the cultivator include an irregularity. In this case there are wide rows shown at 14 and relatively narrow rows shown at 15. What this means is some of the rows in advance of the cultivator will have to be reshaped to a greater degree than the other rows.

For this reason the cultivator 10 includes a fixed rigid tool bar 16 and a moveable tool bar 17 travelling behind the fixed tool bar 16 and pivotable relative thereto via connecting bars 18, 19 and 20. Where the rows to be reshaped are all evenly spaced the connecting bars 18, 19 and 20 would be positioned parallel to the rows.

As can be seen in FIG. 1 the moveable tool bar 17 is displaced to the left. This displacement arises as a consequence of probes 21 and 22 having sensed the irregularity arising from the wider rows 14 and the narrow rows 15 thus causing the lateral displacement of the tool bar 17 to the left to thereby maintain the tool bar 17 centrally between the probes 21 and 22. As can be seen each of the tool bars 16 and 17 carry cultivating tools 23 and located at spaced intervals along the tool bars in order to cultivate the rows. The considered effect of the two tool bars as shown is to give evenly spaced reshaped rows.

Reference will now be made to the drawings of FIGS. 2 to 6 which illustrate a particular form of the present invention it being appreciated that the principles embodied in the present invention are illustrated in FIG. 1 and that the mechanism of control and implementation of the principle being variable.

Figure 2:
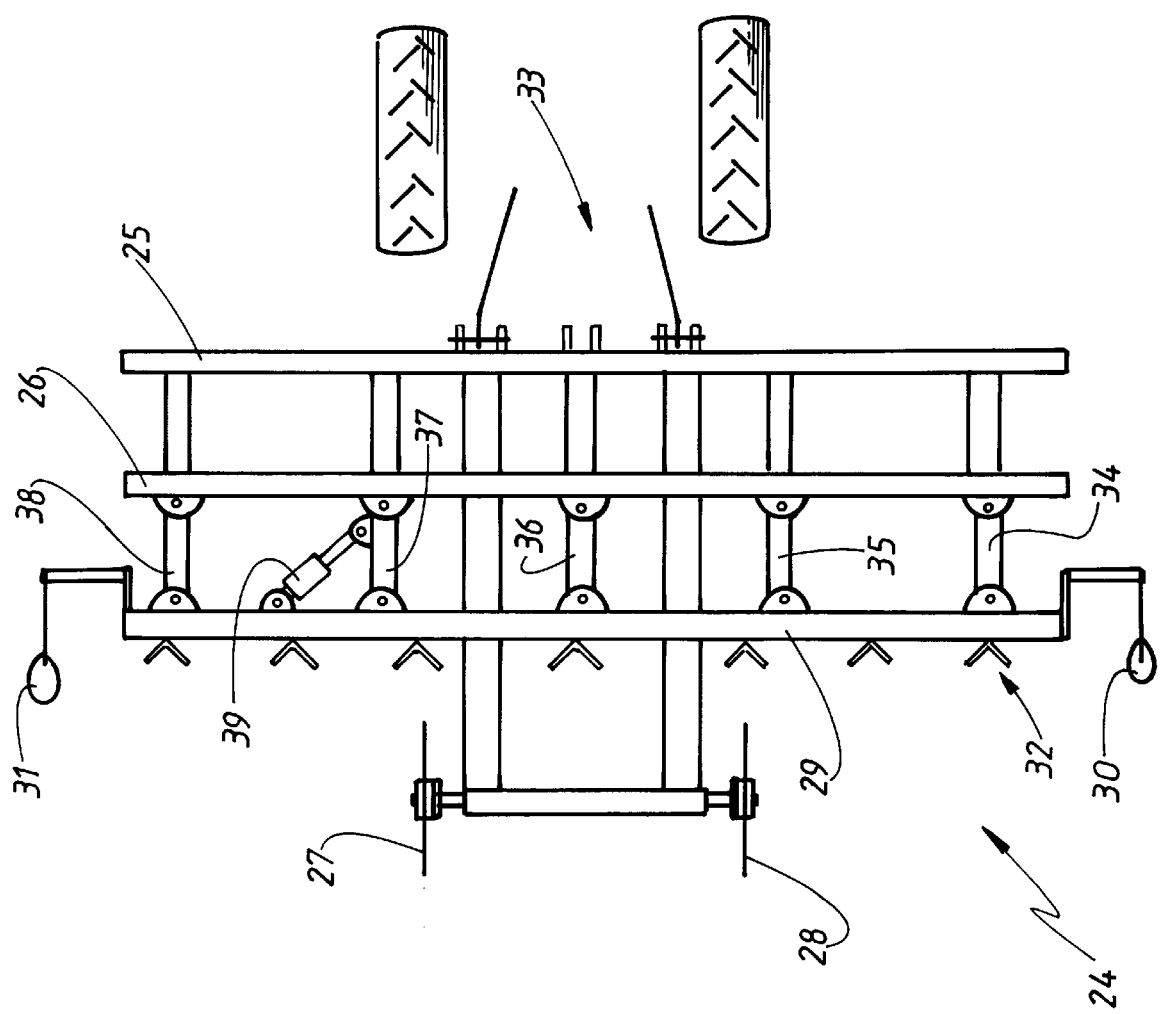
FIG. 2 is a plan view illustrating another embodiment of a row cultivator according to the present invention.

Referring now to FIG. 2 there is illustrated a tractor (not shown) pulling a row cultivator 24, the row cultivator in this case employing two rigid tool bars 25 and 26 rigidly coupled to a trailing pair of coulter wheels 27 and 28 the combination of the tool bars 25 and 26 and the coulter wheels 27 and 28 providing a rigid platform for lateral movement of the moveable tool bar 29 in response to differential movement of the sensing probes 30 and 31 relative to the centre of the tool bar 29. The tool bar 29 carries tools 32 and as in the previous embodiments the other tool bars 25 and 26 can also carry tools. A three point linkage illustrated generally at 33 couples the cultivator to the prime mover 11. Pivoting connecting bars 34, 35, 36, 37 and 38 couple the moveable tool bar 29 to the tool bar 26 and a drive means in the form of a double acting hydraulic cylinder assembly 39 is driven in response to differential movement of the probes 31 and 30 to move the moveable tool bar in response thereto either left or right.

Figure 3:
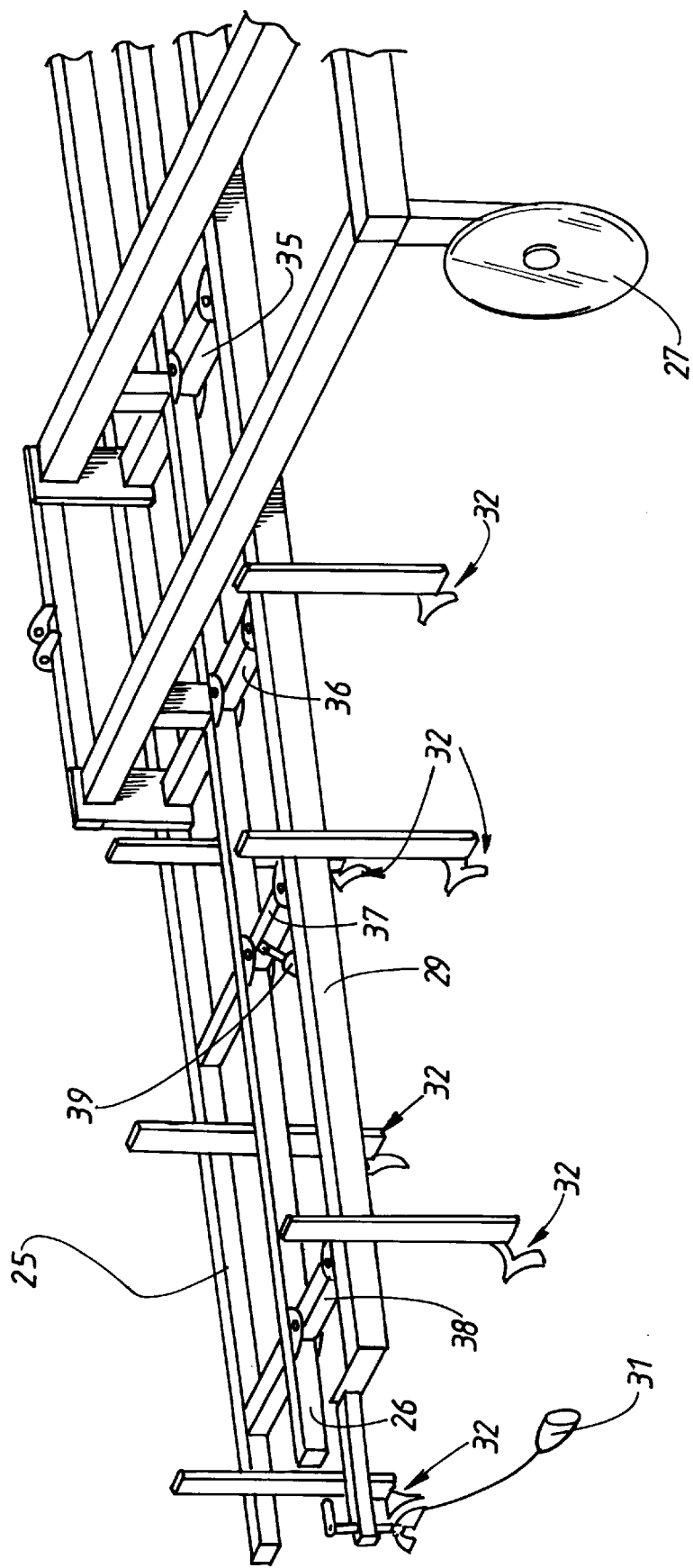
FIG. 3 is a perspective view illustrating the left hand side of a row cultivator according to the present invention.

FIG. 3 illustrates in perspective form the arrangement of FIG. 2 and where appropriate like numerals have been used to illustrate like features it being appreciated that the left hand side as shown is, generally speaking, a mirror image of the right hand side, the cultivating tools having been omitted from the right hand side in this particular drawing.

Figure 4:
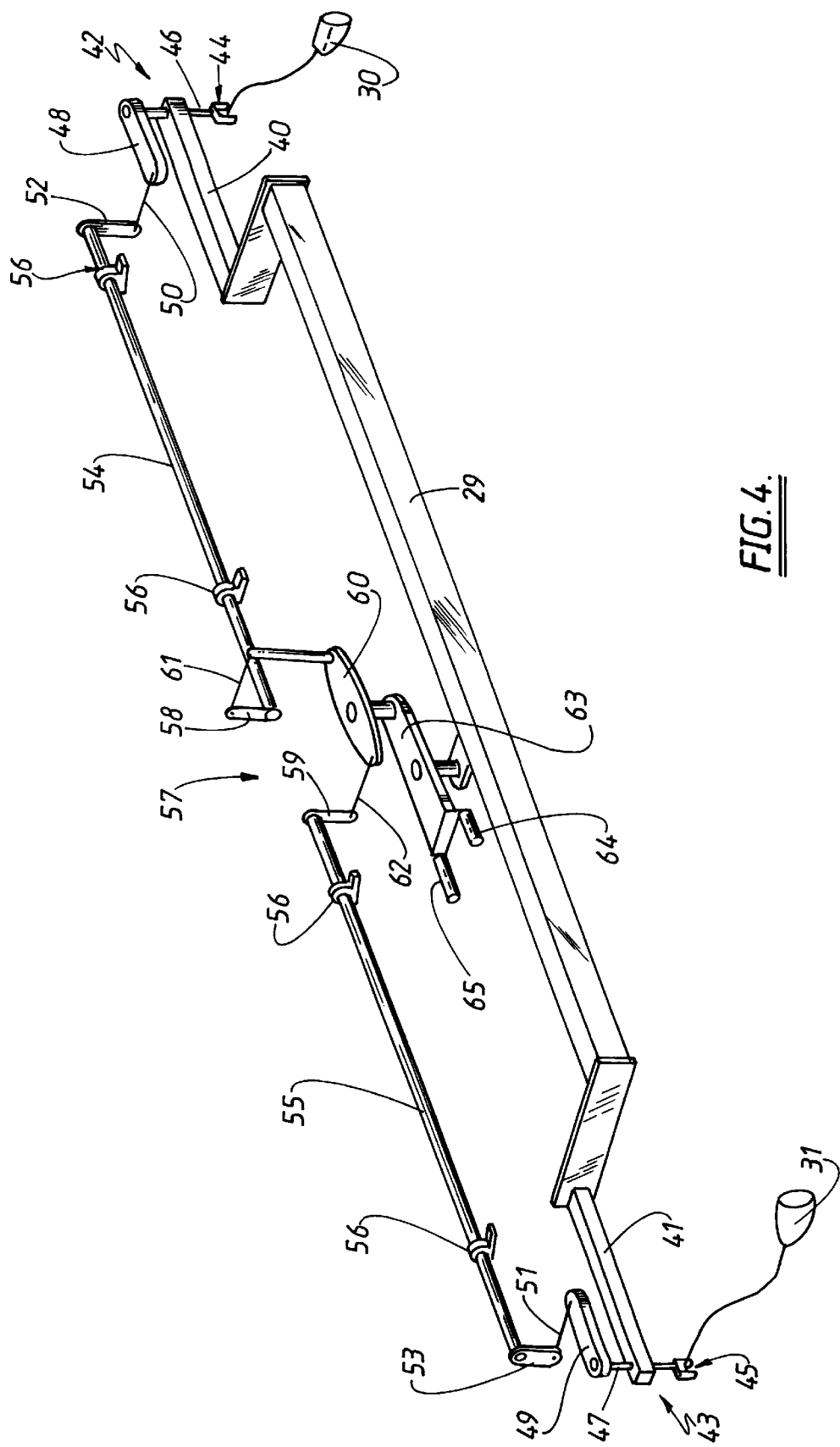
FIG. 4 is a schematic view illustrating a typical sensing means.

Referring now to FIG. 4 the operation of the probes 30 and 31 will be discussed.

The tool bar 29 illustrated in FIG. 4 has mounted at each extremity thereof a projecting bar 40 and 41 carrying an assembly 42 and 43 so that as the probes 30 and 31 travel in respective furrows the probes 30 and 31 are free to rotate about a horizontal axis at pivot 44 and 45 and also about a vertical axis in concert with and causing rotation of the shafts 46 and 47 which in turn rotate the cranks 48 and 49 in response thereto. Linkage rods 50 and 51 operate to rotate cranks 52 and 53 to in turn rotate shafts 54 and 55 through supporting bearing assemblies 56. A differential sensor assembly 57 is of mechanical form and cranks 58 and 59 cause rotation of an averaging plate 60 via links 61 and 62 so that as long as the distance from the probes 30 and 31 to the centre of the tool bar 29 is equal there will be no movement of the sensing plate 63 relative to proximity switches 64 and 65.

In the event there is a differential movement arising from probe 30 or probe 31 moving further either inward or outward than the other probe then the plate 63 will move toward one or the other of the proximity switches 64 or 65. This electrically activates a solenoid valve to cause the hydraulic cylinder assembly 39 to drive the tool bar 29 either to the right or the left so that the tool bar 29 re-positions itself centrally between the two probes 30 and 31. The actual operation of this process is illustrated in FIGS. 5A to 5D and the actual control of the hydraulic cylinder assembly 39 is illustrated in FIG. 6.

Figure 5B:
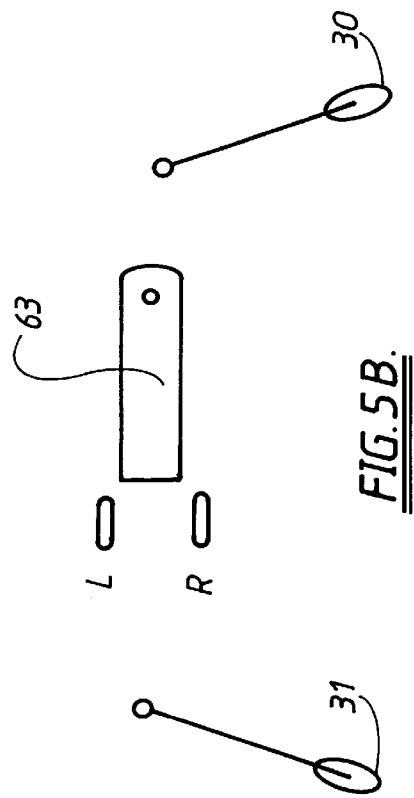
FIGS. 5A to 5D are schematic views illustrating operation of the sensing means.
Figure 5D:
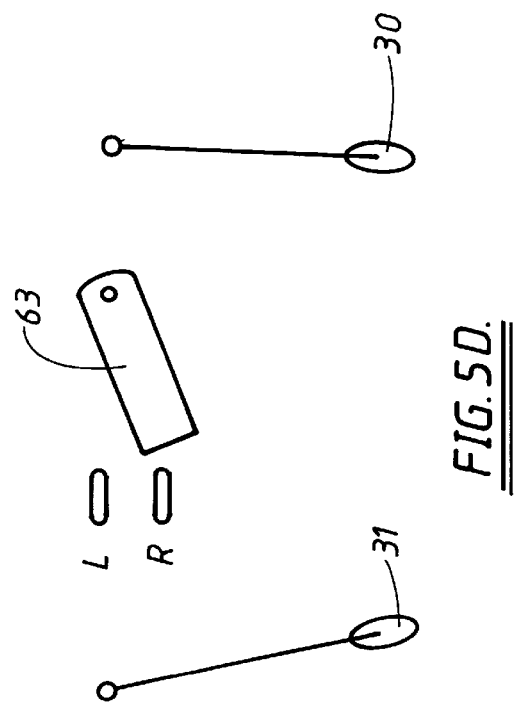
Figure 5A:
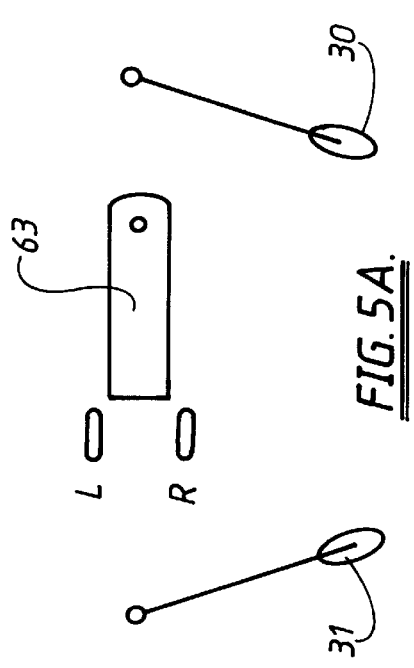
Figure 5C:
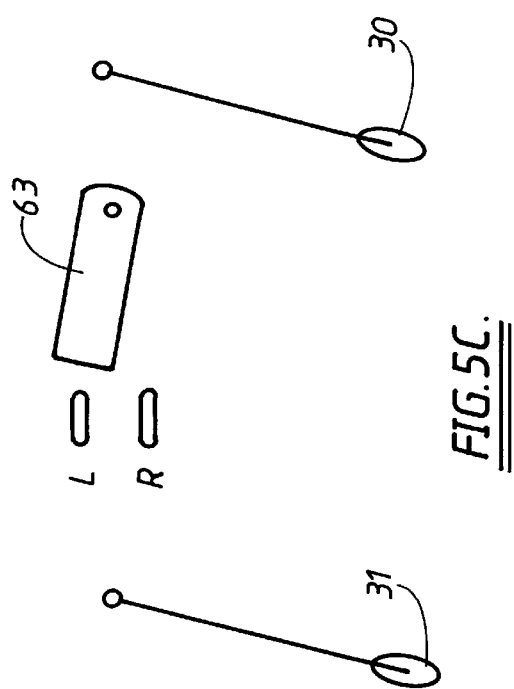

Referring now to FIGS. 5A to 5D examples of movement of the probes 30 and 31 are shown and as can be seen in FIGS. 5A and 5B both probes have moved but the probes have moved an equal distance inward in FIG. 5A and an equal distance outward in FIG. 5B thus giving rise to no movement of the plate 63. On the other hand in FIG. 5C the probes located in the outermost furrows have given rise to movement of the probes to the left meaning that the furrows in advance of the tool bar have an irregularity and the plate 63 is moved to the proximity switch representing left displacement of the tool bar 29 thus initiating displacement to the left into a central position between the now re-positioned probes 30 and 31 as shown in FIG. 5C.

Likewise displacement of the probes to the right as illustrated in, for example, FIG. 5D will result in the plate 63 being displaced toward the proximity switch representing right movement of the tool bar 29 and the tool bar 29 will thus be driven to the right to be centred again between the respective positions of the probes 30 and 31.

Figure 6:
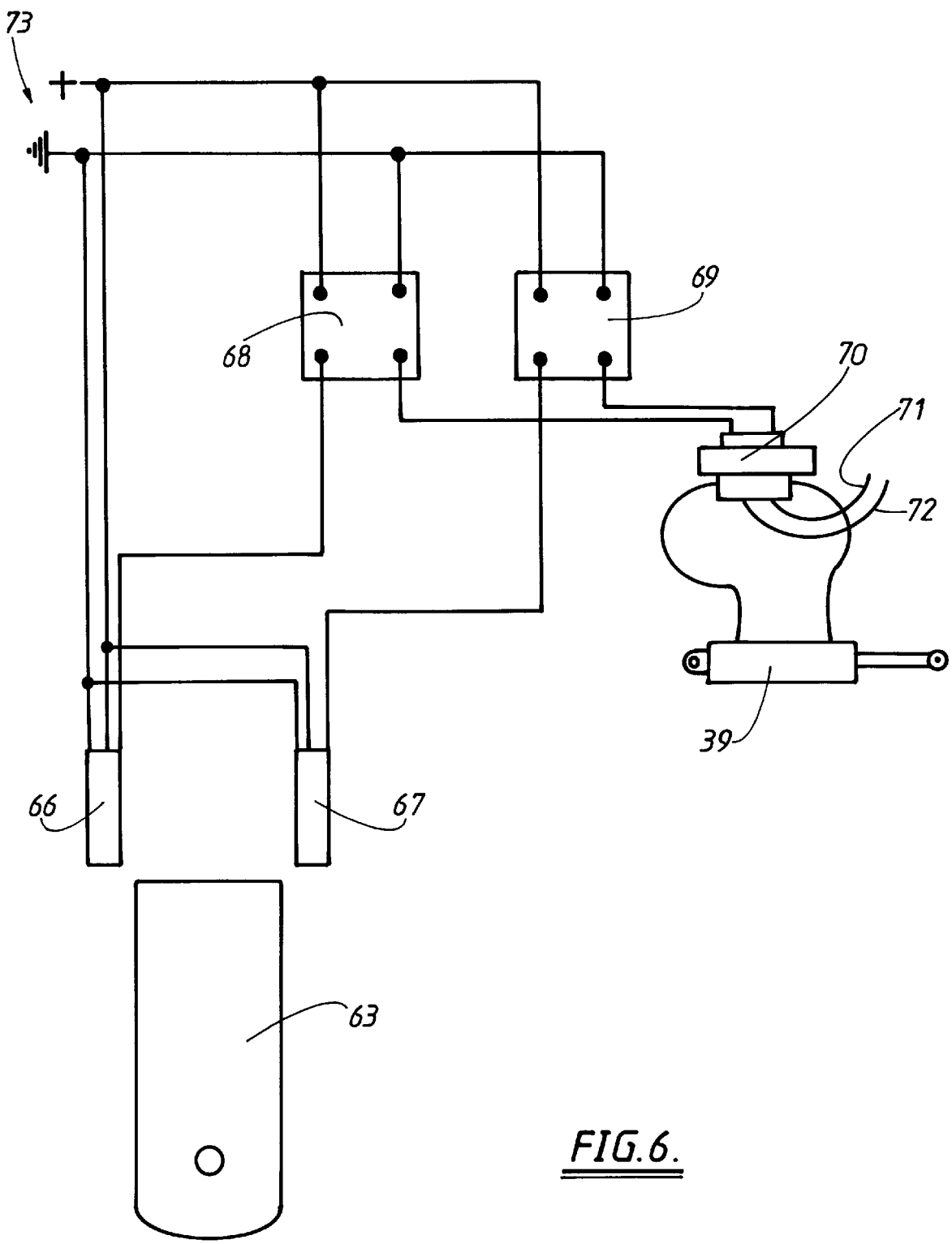
FIG. 6 is a circuit diagram illustrating control and operation of a typical tool bar drive means.

Referring now to FIG. 6 there is illustrated a circuit diagram for control and operation of the hydraulic cylinder assembly 39 in response to movement of the plate 63. In FIG. 6 proximity switch 66 represents movement of the tool bar 29 to the left and proximity switch 67 represents movement of the tool bar 29 to the right. Each of the proximity switches correspond to respective relays 68 and 69 for left and right movement respectively. A two way hydraulic solenoid valve 70 is employed to deliver hydraulic fluid to the cylinder assembly 39. A pressure line from the prime mover is illustrated at 71 and a return line at 72. A 12 volt power supply is illustrated at 73. As can be seen whenever the plate 63 moves towards the proximity switch 63 a signal will be sent to the relay 68 thereby opening the valve 70 to retract or extend the ram 39 in accordance with the desired correction movement of the tool bar. Likewise when the plate 63 moves adjacent to proximity switch 67 the relay 69 will be initiated to move the hydraulic cylinder assembly in the opposite direction.

It will be appreciated from the foregoing that the present invention can be implemented in a mechanical means as illustrated or a combination of mechanical and electrical or completely electrical means can be employed. Likewise although probes travelling in the furrows have been employed any other suitable probe means can be employed to bring about the desired relative movement of the moveable tool bar relative to the prime mover.

Accordingly, whilst the above has been given by way of illustrative example of the present invention many variations and modifications thereto will be apparent to those skilled in the art without departing from the broad ambit and scope of the invention as set out in the appended claims.

I claim:

1. A row cultivator adapted to be drawn behind a prime mover to reshape existing alternating mounds and furrows, the cultivator comprising a transversely extending laterally moveable tool bar having spaced cultivating tools giving rise to alternating, evenly spaced longitudinally extending mounds and furrows as the tools are drawn through soil in a longitudinal direction, the tool bar being mounted for transverse displacement and there being provided sensing means and tool bar drive means for causing lateral displacement of said moveable tool bar in response to said sensing means sensing an irregularity in spacing of the existing mounds and furrows, the lateral displacement of the moveable tool bar giving rise to reshaped mounds and furrows, the reshaped mounds and furrows being absent the irregularity.

2. The row cultivator according to claim 1, wherein the row cultivator employs means providing a rigid platform relative to which the moveable tool bar is moved laterally.

3. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement.

4. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the means holding the one or more extra tool bars rigid against transverse movement comprising one or more coulter wheels travelling behind and coupled to the one or more extra tool bars and anchored in soil against lateral movement as the cultivator is used.

5. The row cultivator according to claim 1, wherein the laterally moveable tool bar has opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero.

6. The row cultivator according to claim 1, wherein the laterally moveable tool bar has opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes.

7. The row cultivator according to claim 1, wherein the row cultivator employs means providing a rigid platform relative to which the moveable tool bar is moved laterally, the tool bar drive means comprising a double acting hydraulic cylinder assembly and cylinder assembly control means operatively disposed to move the moveable tool bar relative to the rigid platform.

8. The row cultivator according to claim 1, wherein the row cultivator employs means providing a rigid platform relative to which the moveable tool bar is moved laterally, the moveable tool bar having opposed lateral extremities and the sensing means comprises respective probes travelling in respective furrows at each of the extremities of the moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero.

9. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the moveable tool bar having opposed lateral extremities and the sensing means comprises respective probes travelling in respective furrows at each of the extremities of the moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero.

10. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the means holding the one or more extra tool bars rigid against transverse movement comprising one or more coulter wheels travelling behind and coupled to the one or more extra tool bars and anchored in soil against lateral movement as the cultivator is used, the moveable tool bar having opposed lateral extremities and the sensing means comprises respective probes travelling in respective furrows at each of the extremities of the moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero.

11. The row cultivator according to claim 1, wherein the row cultivator employs means providing a rigid platform relative to which the moveable tool bar is moved laterally, the laterally moveable tool bar having opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes.

12. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the laterally moveable tool bar having opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes.

13. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the means holding the one or more extra tool bars rigid against transverse movement comprising one or more coulter wheels travelling behind and coupled to the one or more extra tool bars and anchored in soil against lateral movement as the cultivator is used, the laterally moveable tool bar having opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes.

14. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the tool bar drive means comprising a double acting hydraulic cylinder assembly and cylinder assembly control means operatively disposed to move the moveable tool bar relative to the rigid platform means.

15. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the means holding the one or more extra tool bars rigid against transverse movement comprising one or more coulter wheels travelling behind and coupled to the one or more extra tool bars and anchored in soil against lateral movement as the cultivator is used, the tool bar drive means comprising a double acting hydraulic cylinder assembly and cylinder assembly control means operatively disposed to move the moveable tool bar relative to the rigid platform.

16. The row cultivator according to claim 1, wherein the laterally moveable tool bar has opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the tool bar drive means comprising a double acting hydraulic cylinder assembly and cylinder assembly control means operatively disposed to move the moveable tool bar.

17. The a row cultivator according to claim 1, wherein the laterally moveable tool bar has opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes, the tool bar drive means comprising a double acting hydraulic cylinder assembly and cylinder assembly control means operatively disposed to move the moveable tool bar.

18. The row cultivator according to claim 1, wherein the row cultivator employs means providing a rigid platform relative to which the moveable tool bar is moved laterally, the moveable tool bar having opposed lateral extremities and the sensing means comprises respective probes travelling in respective furrows at each of the lateral extremities of the moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the tool bar drive means comprising a double acting hydraulic cylinder assembly and cylinder assembly control means operatively disposed to move the moveable tool bar relative to the rigid platform.

19. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the moveable tool bar having opposed lateral extremities and the sensing means comprises respective probes travelling in respective furrows at each of the lateral extremities of the moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero.

20. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the means holding the one or more extra tool bars rigid against transverse movement comprising one or more coulter wheels travelling behind and coupled to the one or more extra tool bars and anchored in soil against lateral movement as the cultivator is used, the moveable tool bar having opposed lateral extremities and the sensing means comprises respective probes travelling in respective furrows at each of the extremities of the moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the tool bar drive means comprising a double acting hydraulic cylinder assembly and cylinder assembly control means operatively disposed to move the moveable tool bar relative to the rigid platform.

21. The row cultivator according to claim 1, wherein the row cultivator employs means providing a rigid platform relative to which the moveable tool bar is moved laterally, the laterally moveable tool bar having opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes, the tool bar drive means comprising a double acting hydraulic cylinder assembly and cylinder assembly control means operatively disposed to move the moveable tool bar relative to the rigid platform.

22. The row cultivator according to claim 1, wherein the row cultivator employs means providing a rigid platform relative to which the moveable tool bar is moved laterally; the means providing the rigid platform being one or more extra tool bars carrying cultivating tools in advance of the moveable tool bar, there being provided means holding the one or more extra tool bars rigid against transverse movement, the laterally moveable tool bar having opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes, the tool bar drive means comprising a double acting hydraulic cylinder assembly and cylinder assembly control means operatively disposed to move the moveable tool bar relative to the rigid platform means.

23. The row cultivator according to claim 1, wherein the row cultivator employs means providing a rigid platform relative to which the moveable tool bar is moved laterally, the means providing the rigid platform being one or more extra tool bars carrying cultivating tools in advance of the moveable tool bar, there being provided means holding the one or more extra tool bars rigid against transverse movement, the means holding the one or more extra tool bars rigid against transverse movement comprising one or more coulter wheels travelling behind and coupled to the one or more extra tool bars and anchored in soil against lateral movement as the cultivator is used, the laterally moveable tool bar having opposed lateral extremities and the sensing means comprises respective probes travelling in respective furrows at each of the extremities of the laterally moveable tool bar, the probes being spaced from one another by a spacing and there being differential monitoring means monitoring the spacing between the respective probes and a defined reference position such that the monitoring means monitors lateral displacement of the probes about the defined reference position, where both probes are the same distance from the defined reference position displacement of the moveable tool bar will not arise but where a differential spacing arises the tool bar moves either right or left in response to detection of the differential spacing in order to maintain the differential as near as practicable to zero, the defined reference position being selected so that the moveable tool bar is constantly moved so that it is generally centred between the probes, the tool bar drive means comprising a double acting hydraulic cylinder assembly and cylinder assembly control means operatively disposed to move the moveable tool bar relative to the rigid platform.

* * * * *